Nov. 9, 1954        H. YATES        2,693,684
GEAR WHEEL PROVIDED WITH OVERLOAD RELEASE COUPLING
Filed Sept. 23, 1952
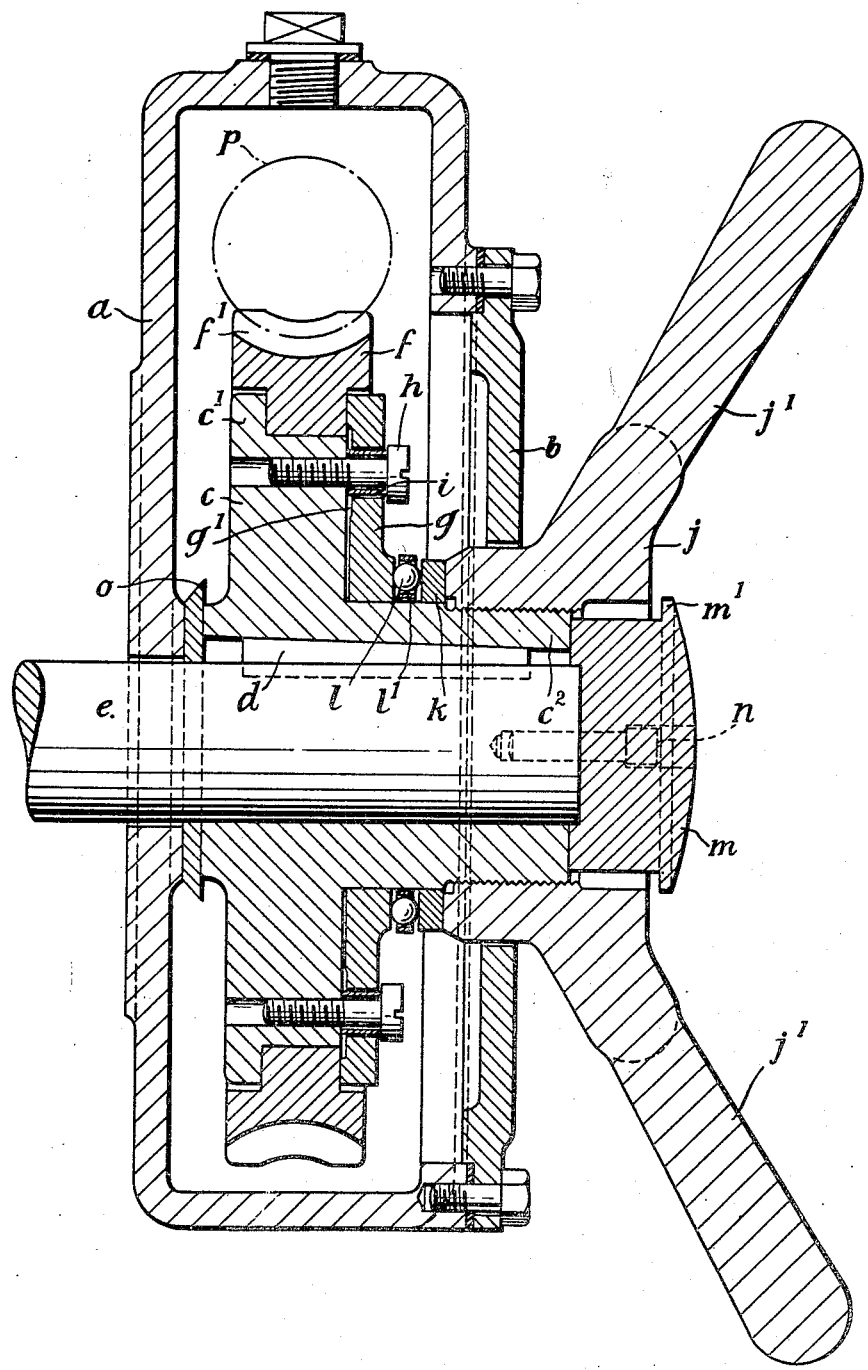
INVENTOR:
HERBERT YATES
BY: Francis C. Boyce

United States Patent Office 2,693,684
Patented Nov. 9, 1954

2,693,684

GEAR WHEEL PROVIDED WITH OVERLOAD RELEASE COUPLING

Herbert Yates, Kingsbury, London, England

Application September 23, 1952, Serial No. 310,986

2 Claims. (Cl. 64—30)

This invention relates to gear wheels, for instance worm wheels, provided with friction clutches, and its object is to provide a clutch which will slip under an overload, and which can be quickly released.

In for instance a mechanism driven through a worm gear, the mechanism may become subjected to a force which tends to turn it whilst such turning is resisted by the worm gear, whereby the mechanism may become damaged, or any shear pin provided therein may be sheared, requiring replacement. For instance in a bench frame whereon a cylindrical vessel is supported between and turned on and by two rollers one of which is driven through a worm gear, on lowering the vessel on to the rollers, the worm gear driven roller may turn, especially if rubber-tyred, but as such rotation cannot be transmitted through the worm gear, some part of the mechanism may become broken, or a shear pin if provided may be sheared.

The friction clutch of the present invention is intended to enable a gear wheel in such a mechanism to slip harmlessly, and also to enable the gear wheel to be quickly released from driving engagement in the mechanism in which it is included.

In the present invention, instead of the toothed rim of a gear wheel, such as a worm wheel being integral or otherwise fast with the hub disc of the gear wheel, the toothed rim can turn on and is clutched to the hub disc by a friction clutch. On release of the friction clutch, the toothed rim of the gear wheel and the hub disc are free to turn relatively to each other.

According to the invention, to provide a gear wheel, such as a worm wheel, with a friction clutch, the teeth of the gear wheel are formed on the periphery of a cylindrical ring journalled, with an exposed lateral face, on the periphery of the hub disc of the gear wheel against a shoulder on such periphery, an annular clutch disc abutting against the exposed lateral face of the toothed ring is held against rotation on an externally screwthreaded sleeve extending axially from the hub disc, and a nut screws on the hub sleeve and when screwed home bears against the radially inner portion of the annular clutch disc and forces the radially outer portion thereof into frictional engagement with the exposed lateral face of the toothed ring before contact of the radially inner portion of the annular clutch disc with the hub disc.

In order that the axial pressure exerted by the screwed-up nut shall force the radially outer portion of the annular clutch disc into frictional engagement with the toothed ring before contact of the radially inner portion with the hub disc, the face of the radially inner portion of the annular clutch disc which is directed towards the hub disc is slightly cut away so as not to be in contact with the hub disc when the clutch is released. Obviously instead the face of the hub disc could be slightly cut away. The annular clutch disc on the face directed towards the hub disc is also annularly recessed so that the annular clutch disc is slightly resiliently yielding and becomes strained in being forced into frictional engagement with the toothed ring.

The annular clutch disc is held against the hub disc and is prevented from rotation on the wheel hub for instance by large headed screws which, at angular intervals are screwed into the hub disc, extending through bushes freely fitting in holes in the annular clutch disc. The length of these bushes is greater but only slightly greater than the thickness of the annular disc and the screws are tightened hard against the bushes so that the large heads of the screws limit axial freedom of the annular disc to that necessary only to allow relative rotation of the toothed ring on the hub disc when the nut is slackened back. Thus, when the clutching of the toothed ring to the gear wheel hub is thus released, in the case of a worm wheel the central plane of the worm wheel teeth on the toothed ring does not become laterally displaced relatively to the axis of the worm which meshes therewith.

Intensity of frictional engagement of the clutch is limited to that exerted when the radially inner portion of the annular clutch disc comes into contact with the hub disc, as hereinafter explained.

A worm gear provided with a friction clutch according to the invention, is shown, by way of example, in the accompanying drawing, which is an axial section.

$a$ is the casing of a worm gear and $b$ is the cover thereof.

$c$ is the hub disc of a worm wheel, keyed, by a key $d$, on a shaft $e$ extending through the casing $a$ and cover $b$.

The periphery of the worm wheel hub disc $c$ is formed with a radial shoulder $c^1$.

$f$ is a cylindrical ring formed on its outer periphery with worm wheel teeth $f^1$, and which is journalled by its inner periphery on the periphery of the hub disc $c$, against the shoulder $c^1$ thereof.

The hub disc $c$ has an axial sleeve extension $c^2$ on which is an annular clutch disc $g$. This annular clutch disc $g$ is held with its radially outer portion in contact with the exposed face of the worm wheel toothed ring $f$, and is prevented from rotation on the hub sleeve $c^2$, by large headed screws $h$ screwed at angular intervals into the hub disc $c$, and which extend through holes in the annular clutch disc $g$ and through a bush $i$ in each hole only slightly longer than the thickness of the disc $g$, against which bushes $i$ the screws $h$ are tightly screwed home.

The face of the annular clutch disc $g$ which is directed towards the hub disc $c$ is annularly recessed at $g^1$, and the radially outer portion of such face can come into frictional engagement with the exposed lateral face of the worm wheel toothed ring $f$ before the radially inner portion thereof can come into contact with the face of the hub disc $c$. For this purpose such radially inner portion is slightly cut away relatively to the radially outer portion.

The outer end of the hub sleeve extension $c^2$ is externally screwthreaded and a nut $j$, formed with lever arms $j^1$, screws thereon. This nut $j$ on being screwed up, presses forcibly, through a ball race washer $k$ and set of balls $l$, in a plate cage $l^1$, against the radially inner portion of the annular clutch disc $g$. The pressure of the nut $j$ slightly bends the annular clutch disc $g$, whereby its radially outer portion is forced into frictional engagement with the lateral face of the worm wheel toothed ring $f$. This is the normal driving position of the parts. On a sufficient overload occurring, the worm wheel toothed ring $f$ can move relatively to the hub disc $c$, by slipping occurring between the former and the annular clutch disc $g$.

The coupling effected by the clutch can be quickly released, by slightly unscrewing the nut $j$.

The nut $j$ is prevented from completely unscrewing off the hub sleeve $c^2$, by encountering a radial flange $m^1$ of a cap $m$, held on the end of the shaft $e$ by screws $n$.

The worm wheel toothed ring $f$ dips into oil contained in the casing $a$. Oil running down the hub disc $c$ towards the shaft $e$ is intercepted by a washer $o$ which presents an edge shedding oil away from the aperture in the casing for the shaft $e$.

The worm wheel toothed ring $f$ is of Phosphor bronze whereas the hub disc $c$ and the annular clutch disc $g$ are of steel.

The worm wheel toothed ring $f$ meshes with a worm the pitch circle $p$ of which is shown, and is held by the annular clutch disc $g$ against appreciable axial displacement laterally thereto.

The intensity of the frictional engagement of the radially outer portion of the annular clutch disc $g$ with the worm wheel toothed ring $f$, is limited to that exerted by the pressure of the radially outer portion of the annular clutch disc g against the worm wheel toothed ring f when the radially inner portion of the annular clutch disc g has been forced by the nut j into contact with the hub disc c. Any tighter screwing-up of this nut j will not increase such frictional engagement. Thus the torque at which the clutch will slip is constant. This torque can be predetermined by predetermining the initial clearance between the radially inner portion of the annular clutch disc g and the hub disc c, with the radially outer portion of the annular clutch disc g in contact, but not in frictional engagement, with the lateral face of the worm wheel toothed ring f, i. e. with the clutch released.

I claim:

1. In a gear wheel, such as a worm wheel, provided with a friction clutch, a hub disc, a shoulder on the periphery of said hub disc, a cylindrical ring formed peripherally with teeth journalled on the periphery of said hub disc against said shoulder and with an exposed lateral face, a sleeve on and extending axially from said hub disc, an annular clutch disc on said sleeve with a radially outer portion in contact with said exposed lateral face of said toothed ring and a radially inner portion spaced from said hub disc and having the face directed towards said hub disc annularly recessed on its radially inner portion, headed screws screwed at angular intervals into said hub disc through holes in said annular clutch disc, bushes on said screws in said holes slightly longer than the thickness of said annular clutch disc, and a nut screwing on an externally screwthreaded end portion of said sleeve and thrusting said radially inner portion of said annular clutch disc.

2. In a gear wheel, such as a worm wheel, provided with a friction clutch, a hub disc, a shoulder on the periphery of said hub disc, a cylindrical ring formed peripherally with teeth journalled on the periphery of said hub disc against said shoulder and with an exposed lateral face, a sleeve on and extending axially from said hub disc, an annular clutch disc on said sleeve with a radially outer portion in contact with said exposed lateral face of said toothed ring and a radially inner portion spaced from said hub disc and having the face directed towards said hub disc annularly recessed on its radially inner portion, headed screws screwed at angular intervals into said hub disc through holes in said annular clutch disc, bushes on said screws in said holes slightly longer than the thickness of said annular clutch disc and against which said screws are screwed up, a nut screwing on an externally screwthreaded end portion of said sleeve, and balls interposed between said nut and said radially inner portion of said annular clutch disc.

References Cited in the file of this patent
UNITED STATES PATENTS

| Number | Name | Date |
|---|---|---|
| 1,147,104 | Lawton | July 20, 1915 |
| 1,596,132 | Waite | Aug. 17, 1926 |
| 2,597,514 | Nash | May 20, 1952 |